United States Patent Office 3,441,562
Patented Apr. 29, 1969

3,441,562
PROCESS FOR PREPARING 2-(4-STILBYL) NAPHTHOTRIAZOLES
Sigmund C. Catino, Castleton, and Albert F. Strobel, Delmar, N.Y., assignors to GAF Corporation, a corporation of Delaware
No Drawing. Filed Sept. 1, 1967, Ser. No. 664,910
Int. Cl. C07d 55/04; D06l 3/12
U.S. Cl. 260—240                          4 Claims

ABSTRACT OF THE DISCLOSURE

A process for preparing 2-(4-stilbyl)naphthotriazoles useful as brightening agents wherein 2-amino-1-naphthalenesulfonic acid is coupled with a diazotized 4-aminostilbene, the coupling reaction being initiated at a temperature below 10° C.

---

The present invention relates to a novel process for the production of 2-(4-stilbyl)naphthotriazoles, useful as brightening agents, particularly for synthetic fabrics and plastics and more particularly, to a novel process for producing such 2-(4-stilbyl)naphthotriazoles wherein a diazotized 4-aminostilbene compound is coupled with 2-amino-1-naphthalenesulfonic acid.

The 2-(4-stilbyl)naphthotriazole compounds produced in accordance with the present invention have the general formula:

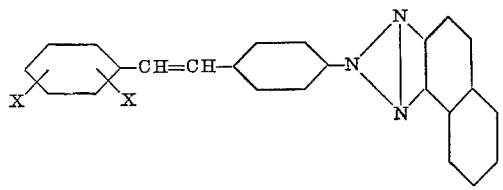

wherein the X's are independently selected from hydrogen and chlorine. Such compounds are generally produced by a process which comprises diazotizing the corresponding 4-aminostilbene with coupling of the diazotized 4-aminostilbene with 2-naphthylamine followed by an oxidation to the naphthotriazole compound. While such a process is generally satisfactory for producing the desired 2-(4-stilbyl)naphthotriazole in fairly substantial yields, such a process has a number of drawbacks or disadvantages.

The 2-naphthylamine which is generally employed in the conventional process is a known carcinogen and thus its use is not desirable. Accordingly, various attempts have been made to produce the 2-(4-stilbyl)naphthotriazole compounds by the use of a reactant other than 2-naphthylamine.

It has been previously suggested to replace the 2-naphthylamine as the coupling component by 2-amino-1-naphthalenesulfonic acid. When this material is used as a coupler in the reaction to produce 2-(4-stilbyl)naphthotriazole, the sulfonic acid group is eliminated during the coupling reaction and the same azo compound results as if 2-naphthylamine were used as the coupler.

When such a process has been previously employed it has been customary to employ a relatively high reaction temperature, i.e. from about 40° C. to about 60° C. This high temperature was utilized on the theory that such a temperature is necessary to replace the sulfonic acid group in order to produce the desired 2-(4-stilbyl)naphthotriazole. Thus for example British Patent 763,696 discloses a process wherein 4-amino-2-stilbenesulfonic acid is diazotized in a conventional manner and coupled with 2-amino-1-naphthalenesulfonic acid at a temperature of from 40° C. to 42° C.

While such a process eliminates the disadvantages associated with the employment of 2-naphthylamine as the coupler in the production of 2-(4-stilbyl)naphthotriazole, it was found that when 4-amino-stilbene or a chlorine derivative thereof, e.g. 4-amino-2',4'-dichlorostilbene, was used as the diazo base, inconsistent low yields were obtained of a product which had a low degree of purity.

In an attempt to improve the yield and purity of the product produced by the use of 2-amino-1-naphthalenesulfonic acid as the coupler in the production of 2-(4-stilbyl)naphthotriazole, reactions were carried out by varying the conditions employed. Thus, for example, a reaction employing a temperature of 15° C.–20° C. was performed only yielding inconsistent lower yields with a lower degree of purity than previously found.

In accordance with the present invention, however, it has been unexpectedly discovered that contrary to the above findings, it is possible to produce 2-(4-stilbyl)-naphthotriazoles in high yields of high purity utilizing 2-amino-1-naphthalenesulfonic acid as a coupler, if the coupling is initiated at a temperature below 10° C. Such a finding is completely contrary to the teaching that a high temperature is necessary in order to replace the sulfonic acid group in the production of 2-(4-stilbyl)naphthotriazoles. By utilizing a coupling initiation temperature of below 10° C. it has been found that it is possible to produce yields which are almost quantitative of a product which has an exceptionally high degree of purity.

Accordingly, it is a principal object of the present invention to provide a novel process for the production of 2-(4-stilbyl)naphthotriazoles which process is free from the disadvantages of prior known processes.

It is a further object of the present invention to provide a novel process for the production of 2-(4-stilbyl) naphthotriazoles which utilizes as the coupler 2-amino-1-naphthalenesulfonic acid.

It is still a further object of the present invention to provide a process for the production of 2-(4-stilbyl) naphthotriazoles wherein 2-amino-1-naphthalenesulfonic acid is coupled with a diazotized 4-aminostilbene, such coupling being initiated at a temperature below 10° C.

Still further objects and advantages of the process of the present invention will become more apparent from the following more detailed description thereof.

In accordance with the process of the present invention the desired 2-(4-stilbyl)naphthotriazoles are produced by the ring closure of an intermediate product produced by the coupling of a diazotized 4-aminostilbene with 2-amino-1-naphthalenesulfonic acid, the coupling reaction being initiated at a temperature below 10° C. The 2-(4-stilbyl) naphthotriazole compounds produced by the process of the present invention correspond to the formula:

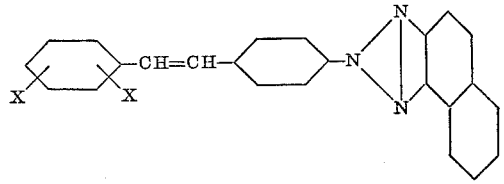

wherein the X's are independently selected from hydrogen and chlorine.

Such compounds are exemplified by:
2-(4-stilbyl)naphthotriazole
2-(2'chloro-4-stilbyl) naphthotriazole
2-(4'-chloro-4-stilbyl)naphthotriazole
2-(2',4'-dichloro-4-stilbyl)naphthotriazole, etc.

The process of the present invention is particularly applicable to the production of 2-(4-stilbyl)naphthotriazoles wherein the X's are the same, i.e. both hydrogen or chlorine. Such compounds are 2-(4-stilbyl)naphthotriazole and 2-(2',4'-dichloro-4-stilbyl)naphthotriazole. The intermediate compound is produced by coupling the appropriate diazotized 4-aminostilbene with 2-amino-1-naphthalenesulfonic acid. The diazotization of the appropriate 4-aminostilbene can be conducted in any suitable manner now conventionally employed for the diazotization of amino stilbenes and other similar materials. Thus, for example, a conventional diazotization process involves the reaction of the aminostilbene with sodium nitrite and hydrochloric acid to produce a diazo product.

The intermediate product is converted into the desired 2-(4-stilbyl)naphthotriazole compound by an oxidation reaction which affects a ring closure of the intermediate compound. The oxidation or ring closure reaction can be accomplished in any conventional manner now employed. The following materials have been employed for accomplishing the oxidation or ring closure to produce the 2-(4-stilbyl)naphthotriazole compounds and similar compounds. The use of cupric salts in aqueous alkaline medium, especially employing ammonium hydroxide as an alkalizing agent, is a well-known method. Additionally, a further method of oxidizing the intermediate compound to produce the desired 2-(4-stilbyl)naphthotriazole employs a cupric salt in a pyridine or picoline medium. Similarly sodium hypochlorite in aqueous medium is frequently employed with hydrogen peroxide, lead peroxide, manganese dioxide, oxygen, sodium dichromate, and other oxidizing agents, all being employed to a lesser or greater extent in various processes. It is to be understood that any of the foregoing systems can be conventionally employed in the process of the present invention, the present invention being primarily directed to the improvement which comprises employing as the coupler in a process to produce 2-(4-stilbyl)naphthotriazoles, 2-amino-1-naphthalenesulfonic acid, the coupling reaction being initiated at a temperature below 10° C.

In accordance with the process of the present invention the coupling reaction of the diazotized 4-aminostilbene with the 2-amino-1-naphthalenesulfonic acid is initiated at a temperature below 10° C., preferably between about 0° C. and 10° C., although lower temperatures can be advantageously employed where desired. It is theorized that the low temperature effects an almost quantitative yield of the desired product with a high degree of purity because the low temperature inhibits diazoamino formation during the coupling reaction. While in some cases, where there is a strong negative group in the diazo base, as in British Patent 763,696, coupling can occur at higher temperature, where there is no strong negative group as in the diazo of the present invention the diazoamino compound can be formed at higher temperatures, thus competing with the coupling reaction. By initiating the coupling reaction in accordance with the present invention at a temperature below 10° C. the coupling proceeds almost quantitatively and, since there is little side reaction associated with the employment of such a low temperature, the product has an exceptionally high degree of purity. Again, this is completely unexpected in view of the fact that previous experimentation has indicated that a higher temperature is needed in order to replace the sulfonic acid group when 2-amino-1-naphthalenesulfonic acid is employed as the coupler in a reaction to produce 2-(4-stilbyl)naphthotriazoles.

Again, it is to be pointed out that the present invention is directed to an improved process of producing 2-(4-stilbyl)naphthotriazoles wherein 2-amino-1-naphthalenesulfonic acid is employed as the coupler, the coupling reaction being initiated at a temperature below 10° C. The system employed for the oxidation or ring closure of the intermediate compound produced by such coupling can be any that is conventionally employed in the production of 2-(4-stilbyl)naphthotriazoles and similar materials.

The products produced in accordance with the present invention have found considerable utility as brightening agents, particularly for synthetic fabrics and plastics. Suitable materials in which the brightening agents can be employed include, for example, the synthetic fabrics such as polyester fabrics, polyamides, and various synthetic cellulosic materials, while suitable plastics include polymerized olefins, acrylic resins, polycarbonates, epoxy resins, vinyl resins such as polyvinylacetate, polyvinylchloride etc.

The following examples illustrate various embodiments of the present invention. It is to be understood that such examples are for purposes of illustration only and the present invention is in no way to be deemed as limited thereto.

EXAMPLE 1

Some 50.8 g. 4-aminostilbene, 80 cc. of water and 78.8 cc. hydrochloric acid (36.5% HCl) were stirred over a steam bath for 45 minutes. The mixture was then cooled to 10° C. with ice chips. Then 47.7 cc. sodium nitrite solution (31.5%) were added, the mixture stirred for 10 minutes at 10° C., then warmed to 25° C. and stirred 30 minutes. Excess nitrite was maintained during this time after which it was destroyed with sulfamic acid. The diazo solution was then cooled to 5° C. in an ice bath.

A solution of 64.3 g. 2-amino-1-naphthalenesulfonic acid in 180 cc. water and 28.8 cc. sodium hydroxide (30% by weight) was prepared. This solution, at 50° C., was added gradually to the diazo solution, the temperature of the diazo solution being maintained at 5–8° C. during the addition. The slurry was stirred for 3 hours, the temperature being maintained at 5–8° C. The charge was then allowed to come to room temperature and stirred for 6 hours at that temperature. Some 20 g. sodium acetate in 40 cc. water were prepared and 10 cc. of this solution were added each hour for 4 additions and the solution was then stirred overnight. The charge was heated on a steam bath for 1 hour at 45° C., then 5 hours at 65° C. until the test for diazoamino was negative. The slurry was filtered, washed with water, then with dilute sodium hydroxide solution and finally with water. After drying, a 99% yield was obtained. The purity of the product, determined spectrophotometrically, was 97.3%.

To produce the brightener, 15.18 g. of this product and 90 cc. picoline were heated to 95° C. then 27.2 g. copper sulfate were added and the mixture refluxed for 2 hours. At 85–90° C. 20 g. sodium sulfide were sprinkled in gradually to a slight excess of sulfide. Then 8 g. salt were added. The charge was reheated to 100° C., clarified at this temperature through a filter. The filter cake was washed with 30 cc. hot picoline. The mother liquor and wash liquor were combined and cooled to 0–5° C. for several hours. The slurry was filtered cold, washed with 150 cc. cold methanol, then with 100 cc. warm water and dried. The yield was 81.5% of theory.

EXAMPLE 2

Example 1 was repeated with the exception that the 4-amino-stilbene was substituted by 68.8 g. 4-amino-2',4'-dichlorostilbene. In this case the aminoazo dye was produced in a yield of about 97% having a high degree of purity.

EXAMPLE 3

Some 28.1 g. 4-aminostilbene, 44 cc. water and 43.6 cc. hydrochloric acid (36.5% HCl) were stirred over a steam bath (90–95° C.) for 45 minutes. Then 138 g. ice chips were added. All at once, at 10° C. 26.4 cc. sodium nitrite solution (31.5%) were added. The mixture was stirred for 10 minutes at 10° C., then warmed to 25° C. The solution was stirred at 25° C. for 30 minutes, excess nitrite being added to maintain an excess. At the end of this time excess nitrite was destroyed. The diazo was then cooled to 5° C. with an ice bath.

A solution of 2-amino-1-naphthalenesulfonic acid was prepared consisting of 35.6 g. 2-amino-1-naphthalenesulfonic acid, 100 cc. of water and 15.9 cc. sodium hydroxide (30% by weight). At 50° C. this solution was added to the diazo solution at the rate of 20 cc. every 5 minutes, while maintaining the diazo solution at 5–8° C. The slurry was then stirred at 5–10° C. for 3 hours, the temperature then allowed to rise slowly to 25° C. and stirred at 25° C. for 6 hours. Then 20 g. of sodium acetate were added to 40 cc. water and 5.53 cc. of this solution was added each hour until 4 additions had been made. The charge was allowed to stand overnight at 25° C., then heated one hour at 45° C., and 5 hours at 65° C. The slurry at this temperature was filtered, washed with 800 cc. water (50° C.), 800 cc. sodium hydroxide solution and finally with 800 cc. water. The filter cake was dried in air at 80° C. A yield of 96.6% was obtained, having a purity of 98.0%.

EXAMPLE 4

Example 3 was repeated exactly except that the diazo solution was maintained at 15–19° C. during coupling and for the next 3 hours. In this case a yield of 94.4% was obtained of a product having a purity of 92.2%.

EXAMPLE 5

Example 3 was again repeated exactly except that the diazo solution was maintained at 20–24° C. during the coupling and for the next 3 hours. A yield of 86.1% was obtained of a product having a purity of 91.1%.

The above examples clearly illustrate the present invention wherein the coupling reaction employing 2-amino-1-naphthalenesulfonic acid as the coupler in the production of 2-(4-stilbyl)naphthotriazoles is initiated at a temperature below 10° C. It is clear from a comparison of Examples 1 through 3 with Examples 4 and 5 that a product of improved purity and improved yield is obtained when the coupling reaction is initiated at a low temperature in accordance with the present invention. This again is quite unexpected in view of previous experiments which indicated that a high temperature was necessary in order to replace the sulfonic acid group when employing 2-amino-1-naphthalenesulfonic acid as a coupler in the reaction to produce 2-(4-stilbyl)naphthotriazoles.

While various embodiments of the present invention have been illustrated by way of specific example, it is to be understood that the present invention is in no way to be deemed as limited thereto but should be construed as broadly as all or any equivalents thereof.

We claim:

1. In a process of preparing 2-(4-stilbyl)naphthotriazole compounds wherein a diazotized 4-aminostilbene compound devoid of strongly negative groups is coupled with a naphthylamine with subsequent oxidation of the intermediate produced to produce the 2-(4-stilbyl)naphthotriazole by ring closure, the improvement which comprises employing as the naphthylamine 2-amino-1-naphthalenesulfonic acid and initiating the coupling reaction at a temperature below 10° C. by adding said 2-amino-1-naphthalenesulfonic acid dissolved in a liquid consisting essentially of water to a cold aqueous solution of said diazotized 4-aminostilbene compound.

2. In the process of claim 1, wherein said diazotized 4-aminostilbene compound is selected from diazotized 4-aminostilbene and chlorine substituted derivatives thereof.

3. In the process of claim 2, wherein said diazotized 4-aminostilbene compound is diazotized 4-aminostilbene.

4. In the process of claim 2 wherein said diazotized 4-aminostilbene compound is diazotized 4-amino-2',4'-dichlorostilbene.

References Cited

FOREIGN PATENTS 1,262,740  4/1961  France.
1,440,403  4/1966  France.

JOHN D. RANDOLPH, *Primary Examiner.*

U.S. Cl. X.R.

117—33.5; 252—301.2; 260—174